United States Patent Office 3,803,167
Patented Apr. 9, 1974

3,803,167
PROCESS FOR PREPARING CYCLICDICARBOX-
IMIDO-SUBSTITUTED PHOSPHONOTHIOATES
Herman O. Senkbeil, Midland, Mich., assignor to The
Dow Chemical Company, Midland, Mich.
No Drawing. Filed Nov. 17, 1971, Ser. No. 199,714
Int. Cl. C07d 27/52
U.S. Cl. 260—326 E                    5 Claims

ABSTRACT OF THE DISCLOSURE

Cyclicdicarboximido-substituted phosphonothioates corresponding to the formula $$R-\overset{S}{\underset{\|}{P}}-(\text{loweralkoxy})_2$$

wherein R represents phthalimido, monomethyl substituted phthalimido, 4-cyclohexene-1,2-dicarboximido or monomethyl substituted 4-cyclohexene-1,2-dicarboximido are prepared by a method which comprises reacting an appropriate O,O-diloweralkyl phosphorochloridothioate with an appropriate N-alkali metal cyclicdicarboximide reactant in the presence of an aromatic tertiary amine catalyst and an inert tertiary alcohol.

BACKGROUND OF THE INVENTION

This invention relates to an improved method for preparing cyclicdicarboximido-substituted phosphonothioates corresponding to the General Formula I $$R-\overset{S}{\underset{\|}{P}}-(\text{loweralkoxy})_2$$
(I)

wherein in this and succeeding formula, R represents phthalimido

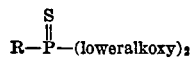

monomethyl substituted phthalimido

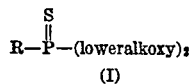

4-cyclohexene-1,2-dicarboximido

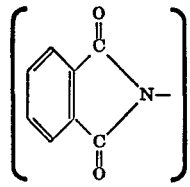

and monomethyl substituted 4-cyclohexene-1,2-dicarboximido

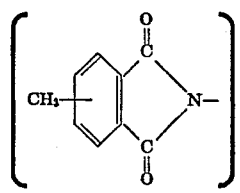

In the present specification and claims, the term "loweralkoxy" refers to alkoxy radicals of from 1 to 4 carbon atoms, inclusive. Such radicals would be for example, methoxy, ethoxy, n-propoxy, isopropoxy, n-butoxy, secondary butoxy and tertiary butoxy. It is to be understood that the two lower alkoxy radicals may be the same or different.

Compounds of the above formula and methods for their preparation as well as a teaching of their utility as pesticides and as active toxicants in compositions for the control of insect, mite, helminth, plant, fungal and bacterial organisms are described in U.S. Pats. 3,336,188 and 3,450,713. The method taught by these references basically entails the reaction of an N-alkali metal derivative of a cyclicdicarboximido compounds with an O,O-dialkylphosphorochloridothioate in the presence of an inert amido reaction medium such as, for example, N-methyl-2-pyrrolidone, dimethylformamide, hexamethylphosphoramide, N-acetylmorpholine and dimethylacetamide.

Another method of preparing the compounds of the present invention is taught in U.S. Pat. 3,399,213 wherein an alkali metal phosphoroamidothioate of the formula

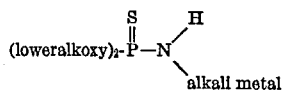

is reacted with a cyclicdicarboxylic anhydride of the formula

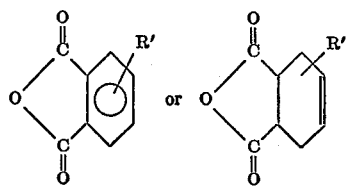

wherein R' is hydrogen or variety of other substituents, in the presence of an inert liquid reaction medium followed by the treatment of the product so produced with a ring-closing reactant such as phosphorus or sulfur based acid halides or an anhydride of an organic mono, di, or polycarboxylic acid.

While the above-described processes are effective to produce the compounds they are not entirely satisfactory because of their low yield and new and improved processes are continually being sougght.

SUMMARY OF THE INVENTION

It has now been found that the cyclicdicarboximido-substituted phosphonothioates of Formula I can be produced in high yields sufficient to warrant economical commercialization and in a novel process by reacting a phosphorochloridothioate of the formula

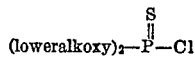

with an alkali metal salt of a cyclicdicarboximide reactant of the formula

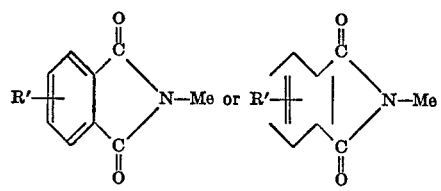

wherein R' is hydrogen or methyl and Me is sodium or potassium in the presence of an aromatic tertiary amine catalyst and a tertiary alcohol as solvent or reaction medium.

Representative compounds embraced by Formula I and which may be prepared by the process disclosed and claimed herein, include:

O,O-dimethyl phthalimidophosphonothioate;
O-ethyl O-methyl phthalimidophosphonothioate;
O,O-diethyl phthalimidophosphonothioate;
O,O-di-n-butyl phthalimidophosphonothioate;
O-ethyl O - isopropyl (4-cyclohexene-1,2-dicarboximido) phosphonothioate;
O,O-di-n-propyl phthalimidophosphonothioate;
O-secondary-butyl O-methyl phthalimidophosphonothioate;
O,O-di-tertiary-butyl phthalimidophosphonothioate;
O - ethyl O-n-propyl (4-cyclohexene-1,2-dicarboximido) phosphonothioate;
O-ethyl O-n-propyl phthalimidophosphonothioate;
O,O - dimethyl (4 - methyl - 4 - cyclohexene-1,2-dicarboximido)phosphonothioate;
O,O - di - n-propyl (4-cyclohexene-1,2-dicarboximido)- phosphonothioate;
O,O-dimethyl (4-cyclohexene-1,2-dicarboximido) - phosphonothioate;
O,O-diethyl (4-methyl phthalimido)phosphonothioate;
O,O-di-n-butyl (3-methyl phthalimido)phosphonothioate;
O,O-diisopropyl phthalimidophosphonothioate;
O,O-dimethyl (3-methyl phthalimido)phosphonothioate;
O,O-dimethyl (4-methyl phthalimido)phosphonothioate;
O,O-diethyl (3-methyl phthalimido)phosphonothioate;
O,O-diisobutyl phthalimidophosphonothioate;
O,O - dimethyl (3 - methyl-4-cyclohexene-1,2-dicarboximido)phosphonothioate; and
O,O - diethyl (4 - methyl - 4-cyclohexene-1,2-dicarboximido)phosphonothioate.

The critical features of the present process are the use of an aromatic tertiary amine as catalyst and a tertiary alcohol as the reaction medium. The absence of either of these components drastically reduces the yield of the desired product.

The amount of solvent employed is not critical but it must be present in at least an equimolar amount based on the amount of the reactants employed. The use of less solvent reduces the yield and/or increases the reaction time.

The aromatic tertiary amine catalyst is employed in an amount of from at least about 5 mole percent up to about 100 mole percent or more by weight based on the weight of the reactants. The specific amount of catalyst employed is not seen as critical. However, as the amount of catalyst is reduced below about 10 mole percent, the yield of product is reduced significantly. Therefore, it is preferred to employ the catalyst in an amount equal to at least 10 mole percent.

Representative aromatic tertiary amines useful as catalysts in the present process include among others, for example, pyridine, alpha-picoline, dimethylaniline, triphenylamine, pyrazine and quinoline. The preferred catalyst is pyridine. Aliphatic tertiary amines have not generally been found to be useful as catalysts in the present process.

Representative tertiary alcohols useful as the solvent or reaction medium in the present process are the tertiary aliphatic alcohols including for example, tertiary butyl alcohol, tertiary amylalcohol and 3-methyl-3-amylalcohol; and the tertiary aromatic alcohols such as, for example, triphenyl carbinol.

Representative phosphorochloridothioate reactants include,

O,O-dimethyl phosphorochloridothioate,
O,O-diethyl phosphorochloridothioate,
O-secondary butyl O-methyl phosphorochloridothioate,
O,O-di-n-butyl phosphorochloridothioate,
O,O-diisopropyl phosphorochloridothioate,
O-ethyl O-methyl phosphorochloridothioate,
O-ethyl O-isopropyl phosphorochloridothioate,
O,O-di-n-propyl phosphorochloridothioate,
O,O-di-tertiary-butyl phosphorochloridothioate,
O,O-diisobutyl phosphorochloridothioate, and
O-tertiary-butyl O-n-propyl phosphorochloridothioate.

Representative N-alkali metal cyclicdicarboximide reactants include the N-sodium and potassium derivatives of phthalimide, 3-methyl phthalimide, 4-methyl-4-cyclohexene-1,2-dicarboximide, 3-methyl-4-cyclohexene-1,2-dicarboximide, and 4-methyl-4-cyclohexene-1,2-dicarboximide.

The desirable results of the present invention are obtained by reacting the lower alkoxy phosphorochloridothioate reactant and the N-alkali metal cyclic dicarboximide reactant, with agitation, in the presence of a tertiary alcohol solvent and in the presence of an aromatic tertiary amine as catalyst.

The reaction is carried out at a temperature in the range of from about 0° C. to about 100° C. For optimum yields a temperature in the range of from about 20° to about 50° C. is preferred. The process is also preferably carried out at atmospheric pressure. The use of pressures above or below atmospheric pressure may be employed but only add to the cost of the process and in reality serve no practical use. When operating within the preferred conditions of temperature, pressure, reactant ratios and solvent and catalyst amounts, reaction times of from about 2–20 hours are sufficient for practical completion.

The amount of the reactants to be employed is not critical, some of the product being formed when employing any proportions. However, since the reaction consumes the reactants in the ratio of one mole of the phosphorochloridothioate reactant per mole of the N-alkali-metal cyclicdicarboximide reactant, the employment of substantially equimolar quantities of the reactants is preferred as this leads to optimum yields.

Upon completion of the reaction, the desired product can be separated from the reaction mixture by first quenching the reaction mixture such as by pouring the reaction mixture into ice water. The solid crude product which precipitates can then be recovered by conventional separatory procedures such as, for example, decantation, centrifugation or filtration. The product, if desired, can be purified by recrystallization from a solvent such as, for example, hexane, methylcyclohexane or the like.

Alternatively, the desired product can be recovered from the reaction mixture by evaporation of the alcohol solvent followed by azeotropic distillation of the amine catalyst and subsequent crystallization of the product. It is to be understood that the specific mode of product separation is not critical and other conventional separatory procedures can be employed.

DESCRIPTION OF SOME PREFERRED EMBODIMENTS

In order that the present invention may be more fully understood, the following examples are given primarily by way of illustration and should not be construed as limitations upon the overall scope of the present invention.

EXAMPLE 1

O,O-diethyl phthalimidophosphonothioate

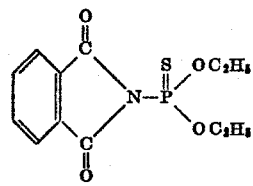

A mixture consisting of 37.0 grams (0.2 mole) of potassium phthalimide, 37.7 grams (0.2 mole) of O,O-diethyl phosphorochloridothioate, 7.9 grams (0.1 mole) (25 mole percent based on weight of reactants) of pyridine and 250 milliliters of tertiary butyl alcohol was heated to 40° C. and maintained at this temperature at atmospheric pressure and under constant agitation for 7 hours. The reaction mixture was poured into ice water. The solid which precipitated was removed by filtration under reduced pressure and air dried. This O,O-diethyl phthalimidophosphonothioate product was thereafter recovered by recrystallization from hexane. The purified product melted at 81°–83° C. and was obtained in a yield of 66.2 percent of theoretical.

Additional runs were carried out as follows employing the general procedure above.

A mixture consisting of 37.0 grams (0.2 mole) of potassium phthalimide, 37.7 grams (0.2 mole) of O,O-diethyl phosphorochloridothioate, 7.9 grams (0.1 mole) (25 mole percent based on weight of reactants) of pyridine and 250 milliliters of tertiary butyl alcohol was heated to 25° C. and maintained at this temperature at atmospheric pressure and under constant agitation for 21.5 hours. The reaction mixture was poured into ice water. The solid which precipitated was removed by filtration under reduced pressure and air dried. O,O-diethyl phthalimidophosphonothioate product was thereafter recovered by recrystallization from hexane. The purified product melted at 81.5°–83.5° C. and was obtained in a yield of 70.8 percent of theoretical.

A mixture consisting of 37.0 grams (0.2 mole) of potassium phthalimide, 37.7 grams (0.2 mole) of O,O-diethyl phosphorochloridothioate, 23.7 grams (0.3 mole) (75 mole percent based on weight of reactants) of pyridine and 150 milliliters of tertiary butyl alcohol was heated and maintained at a temperature between 23° and 30° C. at atmospheric pressure and under constant agitation for 4.5 hours. The reaction mixture which precipitated was removed by filtration under reduced pressure and air dried. The O,O-diethyl phthalimidophosphonothioate product was thereafter recovered by recrystallization from hexane. The purified product melted at 81.5°–84° C. and was obtained in a yield of 72.2 percent of theoretical.

Following the general procedure of Example 1, the following cyclicdicarboximide phosphonothioate are prepared.

O,O-dimethyl phthalimidophosphonothioate melting at 126.5°–128° C. by reacting sodium phthalimide with O,O-dimethyl phosphorochloridothioate in the presence of tertiary amyl alcohol and pyridine.

O-ethyl O-methyl phthalimidophosphonothioate having a molecular weight of 285.3 by reacting sodium phthalimide with O-ethyl O-methyl phosphorochloridothioate in the presence of tertiary butyl alcohol and pyridine.

O,O-di-n-butyl phthalimidophosphonothioate having a refractive index N²⁵/D of 1.5340 and a molecular weight of 355.4 by reacting potassium phthalimide with O,O-di-n-butyl phosphorochloridothioate in the presence of tertiary butyl alcohol and alpha-picoline.

O,O-diethyl(4-cyclohexene - 1,2 - dicarboximido)phosphonothioate having a refractive index N²⁵/D of 1.5205 by reacting the sodium derivative of 4-cyclohexene-1,2-dicarboxamide with O,O-diethyl phosphorochloroidothioate in the presence of tertiary butyl alcohol and dimethyl aniline.

O,O-di-n-propyl phthalimidophosphonothioate melting at 52°–53° C. by reacting sodium phthalimide with O,O-di-n-propyl phosphorochloridothioate in the presence of tertiary butyl alcohol and pyridine.

O,O-di-n-propyl(4-cyclohexene - 1,2 - dicarboximido) phosphonothioate having a molecular weight of 331.4 by reacting the potassium derivative of 4-cyclohexene-1,2-dicarboximide with O,O-di-n-propyl phosphorochloridothioate in the presence of tertiary amyl alcohol and triphenylamine.

Following the general procedures outlined above the following additional compounds are prepared.

O-ethyl O-isopropyl(4-cyclohexene-1,2-dicarboximido) phosphonothioate having a molecular weight of 317.4;

O,O-diethyl(4-methyl - 4 - cyclohexene-1,2-dicarboximido) phosphonothioate, an oil having an actual nitrogen content of 4.69 percent compared to a theoretical nitrogen content of 4.42 percent;

O,O-dimethyl(4-methyl-4-cyclohexene - 1,2 - dicarboximido) phosphonothioate melting at 40°–41.5° C.;

O,O-dimethyl(4 - cyclohexene - 1,2 - dicarboximido) phosphonothioate having a molecular weight of 275.3;

O-ethyl O-n-propyl(4 - cyclohexene-1,2-dicarboxamido) phosphonothioate having a molecular weight of 317.4;

O,O-diethyl(4-methyl phthalimido) phosphonothioate having a melting point of 69.5°–70° C.;

O,O-diisopropyl phthalimidophosphonothioate melting at 77°–81° C.;

O,O-dimethyl(3-methyl-4-cyclohexene - 1,2 - dicarboximido) phosphonothioate having a molecudar weight of 289.2;

O,O-diisobutyl phthalimidophosphonothioate having a melting point of 38°–41° C.;

O,O-dimethyl(4-methyl phthalimido) phosphonothioate having a molecular weight of 285.3; and O-secondary-butyl O-methyl phthalimidophosphonothioate having a molecular weight of 313.3.

PREPARATION OF STARTING MATERIALS

The N-alkali metal derivatives of the cyclicdicarboximido compounds employed as starting materials can be prepared by known procedures as taught in U.S. Pat. 3,450,713 wherein a cyclic dicarboximido compound of the formula H–R is reacted with an alkali metal hydroxide, and the alkali metal derivative of the dicarboximido compound separated from the reaction mixture.

The diloweralkoxy phosphorothioic chlorides employed as starting materials are known compounds and can be prepared by known procedures. For example a phosphorothioic trichloride corresponding to the formula

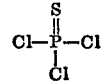

is reacted successfully in either order or simultaneously with a compound having the formula loweralkoxy-H. Good results are obtained when employing the reactants in amounts which represent equimolecular proportions. When both of the loweralkoxy-H reactant is to be the same, good results are obtained when employing two molecular proportions of such reactant and one molecular proportion of phosphorothioic trichloride.

The reaction is carried out in the presence of an acid binding agent such as, for example, an organic tertiary amine compound. Conveniently the reaction is carried out in an inert organic liquid as reaction medium such as, for example, diethyl ether, benzene, carbon tetrachloride or methylene chloride.

What is claimed is:

1. A process for preparing cyclicdicarboximido phosphonothioates corresponding to the formula

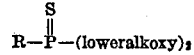

wherein R represents phthalimido, mono-methyl phthalimido, 4-cyclohexene-1,2-dicarboximido or mono-methyl-4-cyclohexene-1,2-carboximido
which comprises, reacting a phosphorochloridothioate corresponding to the formula

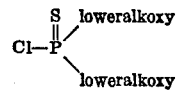

with an N-alkali-metal cyclicdicarboximide corresponding to the formula

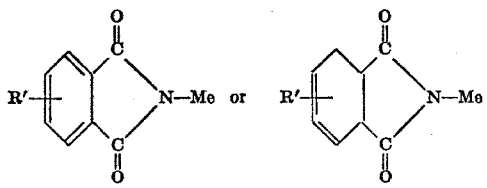

wherein R' represents hydrogen or methyl and Me represents sodium or potassium
at a temperature of from about 0° C. to about 100° C. in the presence of from about 5 to about 100 mole percent by weight of the reactants of an aromatic tertiary amine catalyst and at least an equimolar amount of an inert tertiary alcohol based on the amount of the reactants.

2. The process as defined in claim 1 wherein the temperature is in the range of from about 20° to about 50° C., the aromatic tertiary amine is pyridine and the inert tertiary alcohol is tertiary butyl alcohol.

3. The process as defined in claim 2 wherein the cyclic-dicarboximido phosphonothioate prepared is O,O-diethyl phthalimidophosphonothioate.

4. The process as defined in claim 2 wherein the cyclic-dicarboximido phosphonothioate prepared is O,O-diethyl (4-methyl phthalimido)phosphonothioate.

5. The process as defined in claim 2 wherein the cyclic-dicarboximido phosphonothioate prepared is O,O-di-n-propyl phthalimidophosphonothioate.

References Cited
UNITED STATES PATENTS
3,450,713   6/1969   Tolkmith et al. _____ 260—326 E JOSEPH A. NARCAVAGE, Primary Examiner U.S. Cl. X.R.
260—999

PO-1050
(5/69)

UNITED STATES PATENT OFFICE
CERTIFICATE OF CORRECTION

Patent No. 3,803,167　　　　　　　　　Dated April 9, 1974

Inventor(s) Herman O. Senkbeil

It is certified that error appears in the above-identified patent and that said Letters Patent are hereby corrected as shown below:

Column 2, line 15, change "compounds" to -- compound --;

Column 2, line 48, correct spelling of "sought";

Column 2, line 65, the formula should appear as follows:

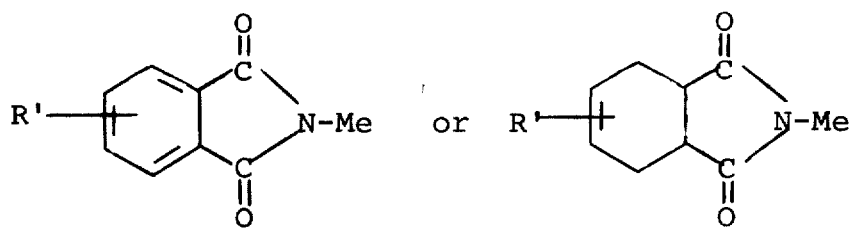

Column 3, line 48, correct spelling of "reactant";

Column 4, line 8, after "4-methyl" insert -- phthalimide,--;

Column 5, line 60, change "dicarboxamide" to -- dicarboximide --;

Column 6, line 11, change "dicarboxamido" to -- dicarboximido --;

Column 6, line 18, correct spelling of "molecular";

Column 7, line 5, the formula should appear as follows:

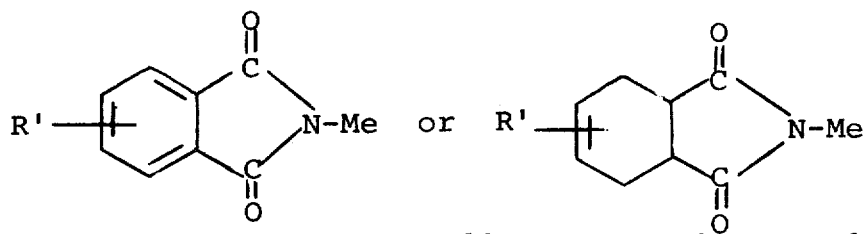

Signed and sealed this 22nd day of October 1974.

(SEAL)
Attest:

McCOY M. GIBSON JR.　　　　　　　　　C. MARSHALL DANN
Attesting Officer　　　　　　　　　　　Commissioner of Patents